(12) United States Patent
Anner et al.

(10) Patent No.: US 7,128,537 B2
(45) Date of Patent: Oct. 31, 2006

(54) ROTOR BLADE FOR A FLOW MACHINE, AND AN ASSOCIATED PULLING-OFF TOOL

(75) Inventors: Emil Anner, Neuenhof (CH); Edouard Sloutski, Moscow (RU); Alexandre Tchekanov, Moscow (RU); Remigi Tschuor, Uster (CH)

(73) Assignee: ALSTOM Technology Ltd., Baden (CH)

( * ) Notice: Subject to any disclaimer, the term of this patent is extended or adjusted under 35 U.S.C. 154(b) by 145 days.

(21) Appl. No.: 10/936,487

(22) Filed: Sep. 9, 2004

(65) Prior Publication Data

US 2005/0100445 A1  May 12, 2005

(30) Foreign Application Priority Data

Sep. 24, 2003 (DE) ................. 103 44 098

(51) Int. Cl.
 *F01D 5/30* (2006.01)
(52) U.S. Cl. ........................ 416/239; 416/248
(58) Field of Classification Search ........... 416/219 R, 416/204 A, 239, 248
See application file for complete search history.

(56) References Cited

U.S. PATENT DOCUMENTS

| | | | | |
|---|---|---|---|---|
| 4,455,730 A | * | 6/1984 | Guenther | ............ 29/252 |
| 5,031,311 A | * | 7/1991 | Comensoli | ............ 29/889.1 |
| 6,571,471 B1 | * | 6/2003 | Hohmann | ............ 29/889.1 |

FOREIGN PATENT DOCUMENTS

| | | |
|---|---|---|
| DE | 695 03 217 T2 | 12/1998 |
| EP | 1 149 662 A1 | 10/2001 |

OTHER PUBLICATIONS

Search Report from DE 103 44 098.4 (Nov. 25, 2003).

* cited by examiner

*Primary Examiner*—Ninh H. Nguyen
(74) *Attorney, Agent, or Firm*—Cermak & Kenealy, LLP; Adam J. Cermak

(57) ABSTRACT

A rotor blade (1) for a flow machine includes an aerodynamic blade (2) and a foot (3). The foot (3) has an anchoring section (5) on a side facing away from the blade (2). A rotor (4) of the flow machine has an axial anchoring groove (6) which is complementary to the anchoring section (5). The anchoring section (5) can be inserted axially into the anchoring groove (6) in order to radially attach the rotor blade (1) to the rotor (4). At least one pulling-off contour (7) is formed on the foot (3), via which an axial pulling-off force can be introduced into the rotor blade (1), which is attached to the rotor (4) with the aid of a pulling-off tool (15) which is complementary to this pulling-off contour (7).

16 Claims, 2 Drawing Sheets

ROTOR BLADE FOR A FLOW MACHINE, AND AN ASSOCIATED PULLING-OFF TOOL

This application claims priority to German application number 103 44 098.4, filed 24 Sep. 2003, the entirety of which is incorporated by reference herein.

BACKGROUND OF THE INVENTION

1. Field of the Invention

The present invention relates firstly to a rotor blade for a flow machine, and secondly to a pulling-off tool for pulling a rotor blade such as this off a rotor of the flow machine.

2. Brief Description of the Related Art

Rotor blades normally have an aerodynamic blade as well as a foot, by means of which the rotor blade can be anchored in a rotor of the flow machine. For this purpose, the foot may have an anchoring section on a side facing away from the blade, which anchoring section can be inserted axially into an anchoring groove which is complementary to it and is axial with respect to the rotation axis of the rotor. The shapes of the anchoring section and of the anchoring groove are in this case matched to one another such that an interlock is formed in the radial direction between the anchoring section and the anchoring groove, by means of which the rotor blade is fixed or anchored radially on the rotor. During operation of the rotor, the rotor blades, particularly in the case of a gas turbine, are subject to very high loads, which can lead to plastic deformation in particular in the area of the anchoring section and of the anchoring groove. Furthermore, dirt can accumulate in the area of the anchoring section and of the anchoring groove. If an external covering strip is provided, adjacent rotor blades may become stuck or jammed in the circumferential direction. For maintenance purposes, inspections and repairs, it may be necessary to remove one or more rotor blades from the rotor. The rotor blades must be pushed out of the anchoring groove again for this purpose. The loads which have been mentioned result in the rotor blades becoming very firmly seated in place, so that a wooden hammer or a plastic hammer may also be used to drive out the rotor blades. However, this can result in damage to the rotor blades. Furthermore, if two or more rotor blades are stuck to one another or are coupled to one another via the external covering strip, these rotor blades must effectively be pushed out of the anchoring grooves at the same time, thus exacerbating the problem described above.

SUMMARY OF THE INVENTION

The invention provides a remedy for this. The principles of the invention deal with the problem of finding a way, for rotor blades of the aforementioned, to simplify the removal of the rotor blades from the rotor of the flow machine.

The invention includes the general aspect of equipping each of the individual rotor blades with at least one pulling-off contour at the foot, which allows the necessary axial pulling-off forces to be introduced into the respective rotor blade via a pulling-off element which is complementary to this pulling-off contour. Furthermore, a pulling-off tool which is supported on the rotor while the respective rotor blade is being pulled off is proposed for driving the pulling-off element. A force introduction point is thus provided or is integrally formed with the aid of the pulling-off contour on the rotor blade, thus making it considerably easier to introduce the necessary pulling-off forces into the rotor blade. Furthermore, the position of the pulling-off contour on the rotor blade can be predetermined such that the risk of the rotor blade being tilted while being pulled off is reduced.

The pulling-off contour which is formed on the rotor blade may, for example, be an axial threaded hole which is introduced into the end face of the foot. The pulling-off element, which is complementary to this, is then formed by a threaded bolt, which can be screwed into the threaded opening. A threaded connection such as this allows very high pulling-off forces to be transmitted. However, relatively little space is available on the rotor blade for incorporating a threaded hole such as this. Furthermore, a threaded hole such as this is susceptible to dirt accumulation.

According to one preferred embodiment, the pulling-off contour has a web, which extends transversely with respect to the axial direction and transversely with respect to the radial direction, and forms an undercut. The pulling-off element can then engage in the undercut in order to pull the rotor blade off the rotor, and can introduce the axial pulling-off force via the web into the rotor blade. Sufficient physical space for a web such as this is available at the foot of the rotor blade. Furthermore, a web such as this can be cleaned relatively well, if arranged appropriately. In addition, a web such as this can be designed without any problems such that sufficiently large pulling-off forces can be transmitted.

The pulling-off tool has a drive device which axially drives the pulling-off element in the pulling-off direction while the rotor blade is being pulled off the rotor. In one preferred embodiment, this drive device may have a slide, which supports the pulling-off element and can be moved by means of a drive axially along a bracket which has a supporting contour, via which the pulling-off tool is supported axially on the rotor while the rotor blade is being pulled off. The support for the reaction forces on the rotor results in an intrinsically closed power flow, which requires no external support for the reaction forces and thus makes it considerably easier to introduce the pulling-off forces.

According to another aspect, the bracket may have a support, which has the supporting contour and is in the form of a ring or ring segment which is arranged coaxially with respect to the rotor when the pulling-off tool is fitted correctly to the rotor. This support may then have two or more slides and/or two or more drives, so that it is possible to simultaneously pull two or more rotor blades off the rotor at the same time. This is particularly important when two or more rotor blades are stuck to one another via an external covering strip.

Further important features and advantages of the present invention can be found in the drawings and in the associated description of the figures relating to the drawings.

BRIEF DESCRIPTION OF THE DRAWINGS

One preferred exemplary embodiment of the invention is illustrated in the drawings and will be explained in more detail in the following description, in which the same reference symbols relate to the same, similar or functionally identical components. In the figures, in each case schematically.

DETAILED DESCRIPTION OF THE PREFERRED EMBODIMENTS

Figure 1:
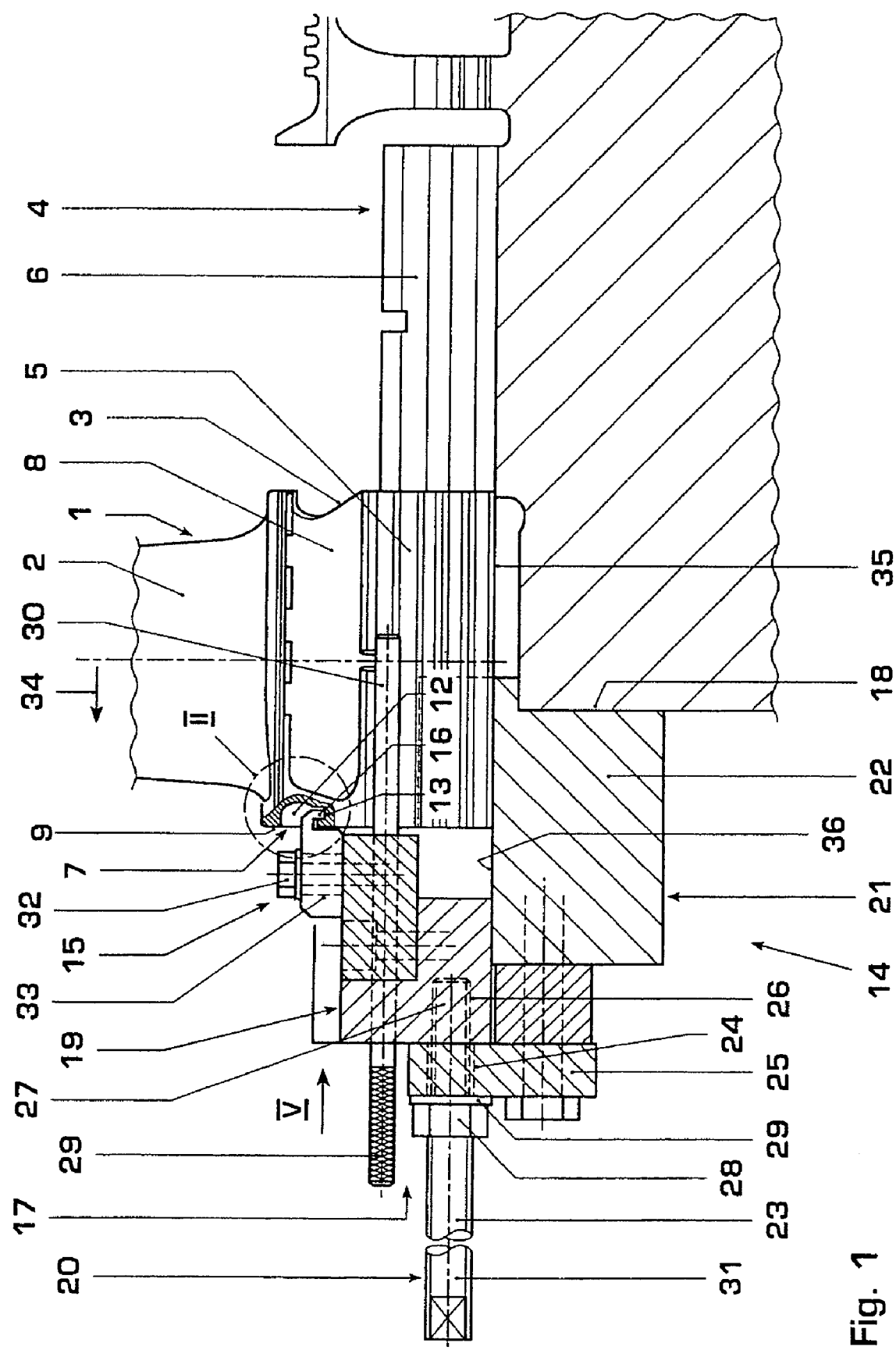
FIG. 1 shows a longitudinal section through a rotor of a flow machine while a rotor blade is being pulled off.
Figure 2:
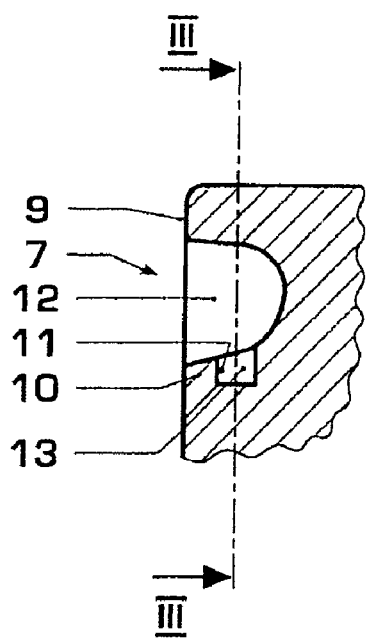
FIG. 2 shows an enlarged view of a detail II in FIG. 1, which corresponds to a section view along the section lines II in FIG. 5.
Figure 5:
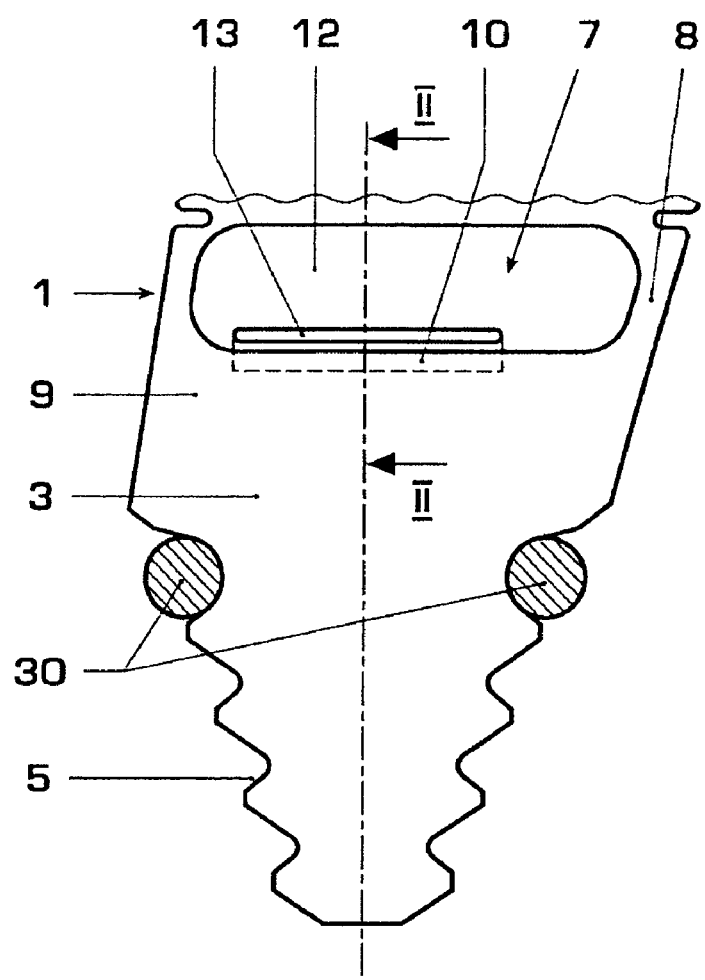
FIG. 5 shows a view of a foot of the rotor blade corresponding to an arrow V in FIG. 1.
Figure 4:
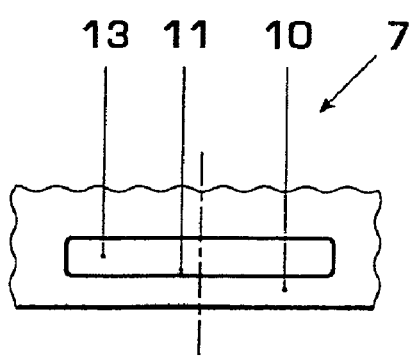
FIG. 4 shows a view corresponding to an arrow IV in FIG. 3.
Figure 3:
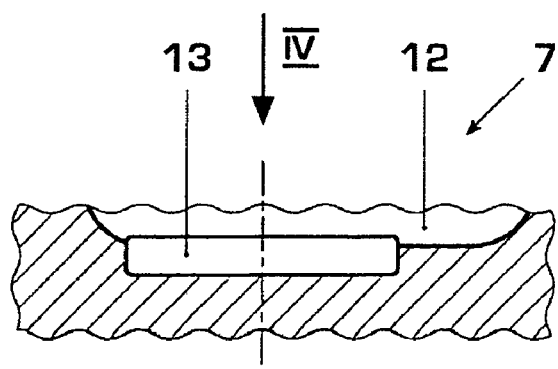
FIG. 3 shows a section view corresponding to the section lines III in FIG. 2.

As is shown in FIG. 1, a rotor blade 1 according to the invention normally has an aerodynamically shaped blade 2, which is used for flow guidance, as well as a foot 3, by means of which the rotor blade 1 can be attached to a rotor 4 of a flow machine, for example a turbine or a compressor. As is shown in FIGS. 1 and 5, an anchoring section 5 is formed on a side of the foot 3 facing away from the blade 2 for these attachment purposes, which anchoring section 5 in each case has a type of tooth system on sides which face away from one another in the circumferential direction of the rotor 4, with these tooth systems converging in the direction of a rotation axis of the rotor 4. A tooth system contour such as this may also be referred to as a "fir-tree tooth system".

As is shown in FIG. 1, the rotor 4 has an axial anchoring groove 6 for each rotor blade 1, that is to say an anchoring groove which runs parallel to the rotation axis of the rotor 4, which is shaped to be complementary to the anchoring section 5 of the rotor blade 1. In a corresponding manner, the anchoring groove 6 in this case likewise has axial tooth systems, which converge towards the rotation axis of the rotor 4, on walls which are opposite one another in the circumferential direction of the rotor 4.

The individual teeth of this tooth system in this case extend in the axial direction, that is to say parallel to the rotation axis of the rotor 4, so that the anchoring section 5 and the anchoring groove 6 accordingly have longitudinal tooth systems.

The anchoring groove 6 is open at at least one axial end, on the left in FIG. 1, so that the anchoring section 5 of the rotor blade 1 can be fitted axially to this open end of the anchoring groove 6, and can be pushed on. In the process, the anchoring section 5 is pushed axially into the anchoring groove 6. The complementary interlocking contours of the anchoring section 5 and of the anchoring groove 6, that is to say the tooth systems in this case, thus engage in one another, such that the pushed-on rotor blade 1 is attached to or anchored on the rotor 4 in the radial direction by means of the interlock which is formed between the anchoring section 5 and the anchoring groove 6.

According to the invention, the rotor blade 1 is now also equipped with a pulling-off contour 7, on which axial pulling-off forces can be introduced into the rotor blade 1. This pulling-off contour 7 is in this case arranged on the foot 3, to be precise in particular on a section 8 of the foot 3 which is at a distance from the anchoring section 5. In the preferred embodiment described here, the pulling-off contour 7 is formed on an axial end face 9 of the foot 3. Since a rotor blade 1 is normally a single-part, integral component, the pulling-off contour 7 is preferably an integral component of the rotor blade 1, and not a component that is fitted retrospectively.

In the embodiment shown here, the rotor blade 1 is equipped with only a single pulling-off contour 7. It is obvious that the rotor blade 1 may in principle also be equipped with two or more pulling-off contours 7, depending in particular on the space required for the respective variant of the chosen pulling-off contour 7.

As is shown in FIGS. 1 to 5, the preferred pulling-off contour 7 shown here has a web 10 which is arranged such that it extends transversely with respect to the axial direction and transversely with respect to the radial direction, in each case with respect to the rotor 4, that is to say effectively tangentially with respect to the circumferential direction of the rotor 4. Furthermore, the web 10 is arranged such that it forms an undercut 11 on the foot 3. The required pulling-off forces can now be applied to the web 10 on this undercut 11, and can thus be introduced into the rotor blade 1.

On its end face 9, the foot 3 preferably has an axially open cavity 12, in which the web 10 and the undercut 11 are formed. This allows the pulling-off contour 7 to be integrated in the rotor blade 1, or in its foot 3, with relatively little additional weight, and occupying a comparatively small amount of space. The web 10 and the undercut 11 can be produced particularly easily in the cavity 12 by means of a groove 13, which is incorporated into the foot 3 in the cavity 12. The groove 13 is in this case likewise oriented transversely with respect to the axial direction and transversely with respect to the radial direction of the rotor 4, that is to say tangentially. The groove 13, as illustrated here, is preferably arranged in an area of the cavity 12 facing the anchoring section 5, so that the groove 13 is open on a side facing away from the anchoring section 5.

The cavity 12 may even be incorporated in a casting mold for producing the rotor blade 1, thus simplifying the production of the cavity 12. In principle, the web 10 and the undercut 11 or groove 13 may also be formed integrally during the process of casting the rotor blade 1. It is likewise possible to incorporate the groove 13 and thus the web 10 and the undercut 11 in the cavity 12 retrospectively by machining processes, for example by erosion.

Although the pulling-off contour 7 illustrated here, with the web 10 and the undercut 11, is particularly advantageous for introduction of the necessary pulling-off forces, the pulling-off contour 7 may in principle also have any other desired, suitable shape. For example, a further variant may be mentioned here in which the pulling-off contour 7 is formed by a threaded hole, which is incorporated in the axial end face 9 of the foot 3 and extends in the axial direction.

The high loads which occur on the rotor blade 1 during operation may lead inter alia to plastic deformation and/or to dirt accumulation in the area of the anchoring section 5 and of the anchoring groove 6, making it more difficult to pull the rotor blade 1 off the rotor 4 axially. As is shown in FIG. 1, the present invention proposes a pulling-off tool 14 for pulling the rotor blade 1 off the rotor 4.

This pulling-off tool 14 has at least one pulling-off element 15, which is designed to be complementary to the pulling-off contour 7. In the present case, the pulling-off element 15 has a hook 16 which can engage in the groove 13. This means that the hook 16 is shaped such that it can engage behind the web 10 and can thus engage in the undercut 11. In this way, the hook 16 on the pulling-off element 15 can be used to introduce the necessary pulling-off forces into the pulling-off contour 7 on the rotor blade 1.

The pulling-off tool 14 is also equipped with a drive device 17, with whose aid the pulling-off element 15 can be driven in the axial direction. Furthermore, the pulling-off tool 14 has a supporting contour 18, with whose aid the supporting tool 14 can be supported axially on the rotor 4.

In the embodiment shown here, the drive device 17 has a slide 19 as well as a drive 20. The slide 19 supports the pulling-off element 15 and can be moved relative to a bracket 21 with the aid of the drive 20. The bracket 21 is equipped with the supporting contour 18. In the present case, the bracket 21 has a support 22, on which the supporting contour 18 is formed.

In the embodiment shown here, the drive 20 is equipped with an axial threaded rod 23, which passes through an unthreaded hole 24. This unthreaded hole 24 is formed on the bracket 21 or, as here, on a component 25 which is attached to the bracket 21. A first end 27 of the threaded rod 23 is attached to the slide 19. For this purpose, the slide 19 expediently has a threaded hole 26, into which the first end 27 of the threaded rod 23 is screwed. A nut 28 is now screwed onto the threaded rod 23 on a side facing away from the slide 19, and is axially supported, for example via a washer 29, on the bracket 21 or on the component 25.

The preferred embodiment of the pulling-off tool 14 shown here also has a holding device 29 which allows the rotor blade 1 to be supported at the side, that is to say in the circumferential direction, while being pulled off. As is shown in FIGS. 1 and 5, the holding device 29 has, for example, two rods 30 which are mounted in the slide 19 such that they can be moved axially and which are arranged and are of such a size that they can interact with the anchoring section 5 in order to support the rotor blade 1 at the side. By way of example the rods 30 engage in the side tooth systems on the anchoring section 5. The rotor blade 1 can thus be held securely on the slide 19.

It is obvious that, in principle, the pulling-off element 15 may also have a different shape. For example, a variant should be mentioned here in which the pulling-off element 15 may be in the form of a threaded bolt, which can be screwed into a pulling-off contour 7 which is complementary to it and is in the form of a threaded hole.

In principle, the pulling-off tool 14 can be designed such that just one, and only one, rotor blade 1 can be pulled off the rotor 4 in this way. However, in one expedient embodiment, the pulling-off tool 14 is designed such that it can be used to pull two or more rotor blades 1, which are adjacent to one another in the circumferential direction, off the rotor 4 essentially at the same time. This is particularly advantageous when two or more rotor blades 1 are stuck to one another via an external covering strip and this sticking cannot be released until the rotor blades 1 have been pulled off the rotor 4. In an embodiment such as this, the support 22 may then be in the form of a ring or a ring segment, with the ring or the ring segment then being of such a size that it can be arranged on the rotor 4, coaxially with respect to it, while the rotor blades 1 are being pulled off. Two or more slides 19 and/or two or more drives 20 may then be held on this support 22.

The pulling-off tool 14 according to the invention operates as follows:

In the initial state, the rotor blade 1 and its anchoring section 5 are still completely located in the anchoring groove 6 and in the rotor 4. The pulling-off tool 14 is fitted to the rotor 4, such that the supporting contour 18 is supported axially on the rotor 4. The slide 19 is moved to the maximum extent towards the rotor blade 1. The nut 28 is then located at a second end 31 of the threaded rod 23, at a distance from the slide 19, and is supported axially on the bracket 21 or on its component 25. The threaded rod 23 is moved axially in a corresponding manner towards the rotor blade 1. The pulling-off element 15 can now be made to engage with the pulling-off contour 7, and may be firmly connected to the slide 19. For this purpose, the pulling-off element 15 is fixed, for example, on the slide 19 by means of a screw 32. The pulling-off element 15 may in this case have an axially oriented elongated hole 33, which makes it easier to position the pulling-off element 15. Once the pulling-off element 32 has been fitted, its hook 16 engages in the groove 13 in the pulling-off contour 7. The rods 30 of the holding device 29 cannot yet engage in the anchoring section 5 of the rotor blade 1, and are thus moved axially in the slide 19, in this case to the left.

The nut 28 can now be tightened in order to pull the rotor blade 1 off the rotor 4. In the process, axial forces are introduced into the slide 19 via the threaded rod 23, and are introduced into the rotor blade 1 via the pulling-off element 15 and the pulling-off contour 7. Since the force introduction point can be chosen to be advantageous for the pulling-off process by the arrangement of the pulling-off contour 7, relatively large axial forces can be transmitted without any risk of the rotor blade 1 being tilted. The rotor blade 1 is thus caused to move corresponding to an arrow 34, and is thus gradually pulled off the rotor 4. As the pulling-off movement progresses, the rods 30 can be inserted into the tooth system of the anchoring section 5, in order to secure the rotor blade 1 at the side. Once a predetermined pulling-off distance has been reached, the rotor blade 1 and its anchoring section 5 make contact by means of a lower face 35, facing the rotor 4, with a supporting surface 36, which faces the rotor blade 1, is formed on the bracket 21 or on its support 22, and then provides additional radial support for the rotor blade 1.

Furthermore, one particularly important feature of the pulling-off tool 14 according to the invention is that reaction forces which are produced when the pulling-off forces are introduced into the rotor blade 1 are supported via the supporting contour 18 on the rotor 4, so that this results in an intrinsically closed force flow, which makes it considerably easier to produce the required, relatively large pulling-off forces, and to support them.

LIST OF REFERENCE SYMBOLS

1 Rotor blade
2 Blade
3 Foot
4 Rotor
5 Anchoring section
6 Anchoring groove
7 Pulling-off contour
8 Area of 3
9 End face of 3
10 Web
11 Undercut
12 Cavity
13 Groove
14 Pulling-off tool
15 Pulling-off element
16 Hook
17 Drive device
18 Supporting contour
19 Slide
20 Drive
21 Bracket
22 Support
23 Threaded rod
24 Unthreaded hole
25 Component
26 Threaded hole
27 First end of 23
28 Nut
29 Holding device
30 Rods
31 Second end of 23
32 Screw
33 Elongated hole
34 Pulling-off direction 35 Lower face of 1/5
36 Upper face of 21/22

While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

What is claimed is:

1. A rotor blade for a flow machine, the flow machine including a rotor and an axial anchoring groove in the rotor, the rotor blade comprising:
    an aerodynamic blade and a foot;
    wherein the foot includes an anchoring section on a side facing away from the blade, which anchoring section is configured and arranged to be inserted axially into the axial anchoring groove which is complementary to the foot anchoring section, wherein the rotor blade can be radially attached to the rotor by an interlock between the anchoring section and the anchoring groove;
    at least one pulling-off contour formed on the foot by which an axial pulling-off force can be introduced into the rotor blade; and
    a pulling-off element complementary to the pulling-off contour, configured and arranged to apply a force to the blade at the pulling-off contour.

2. The rotor blade as claimed in claim 1, wherein the foot includes an axial end face, and wherein the at least one pulling-off contour is arranged on the axial end face of the foot.

3. The rotor blade as claimed in claim 2, wherein the at least one pulling-off contour comprises an axial threaded hole which is introduced into the end face of the foot.

4. The rotor blade as claimed in claim 1, wherein the at least one pulling-off contour comprises a web which extends transversely with respect to the axial direction and transversely with respect to the radial direction, and which includes an undercut; and
    wherein the pulling-off element is configured and arranged to engage in the undercut to pull the rotor blade off the rotor, and to introduce the axial pulling-off force via the web into the rotor blade.

5. The rotor blade as claimed in claim 4, further comprising:
    a cavity formed in an axial end face of the foot; and
    wherein the web and the undercut are positioned in the cavity.

6. The rotor blade as claimed in claim 5, further comprising:
    a groove formed within the cavity in the foot; and
    wherein the web and the undercut are formed by the groove.

7. The rotor blade as claimed in claim 6, wherein the groove is open radially.

8. The rotor blade as claimed in claim 6, wherein the groove is positioned in an area of the cavity facing the anchoring section.

9. The rotor blade as claimed in claim 1, wherein the at least one pulling-off contour is positioned in an area of the foot which is at a distance from the anchoring section.

10. A pulling-off tool for pulling a rotor blade off a rotor of a flow machine, the rotor blade including a pulling-off contour, the tool comprising:
    at least one pulling-off element configured and arranged to be complementary to the pulling-off contour of the rotor blade;
    a drive device configured and arranged to axially drive the at least one pulling-off element in a pulling-off direction while the rotor blade is pulled off the rotor;
    a supporting contour by which the pulling-off tool is supported axially on the rotor when the rotor blade is being pulled off;
    a bracket comprising said supporting contour; and
    wherein the drive device includes a slide which supports the pulling-off element and is configured and arranged to be moved by a drive axially along said bracket.

11. The pulling-off tool as claimed in claim 10, configured and arranged to simultaneously pull two or more rotor blades off the rotor.

12. The pulling-off tool as claimed in claim 10, wherein the bracket includes a support, which support comprises said supporting contour and a ring or ring segment arranged coaxially with respect to the rotor when the at least one rotor blade is being pulled off; and
    wherein the support comprises two or more slides, two or more drives, or both.

13. The pulling-off tool as claimed in claim 10, further comprising:
    an unthreaded hole formed on the bracket or on a component attached to the bracket; and
    wherein the drive comprises an axial threaded rod having one end attached to the slide and passing through said unthreaded hole, and a nut screwed onto the threaded rod on a side facing away from the slide.

14. The pulling-off tool as claimed in claim 10, further comprising:
    at least one holding device configured and arranged to interact with the anchoring section of the rotor blade while the rotor blade is being pulled off, and to support the rotor blade at the side.

15. The pulling-off tool as claimed in claim 10, the pulling-off contour of the rotor blade including a web and an undercut, and wherein the pulling-off element includes a hook configured and arranged to engage behind the web and to engage in the undercut.

16. The pulling-off tool as claimed in claim 10, wherein the pulling-off element comprises a threaded bolt, wherein the pulling-off contour comprises a threaded hole, and wherein the threaded bolt can be screwed into the threaded hole.

* * * * *